United States Patent
Kraus

(10) Patent No.: US 11,160,213 B2
(45) Date of Patent: Nov. 2, 2021

(54) ROUND BALER WITH PRE-CUTTER AND CROP DISTRIBUTION SYSTEM

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 213 days.

(21) Appl. No.: 16/511,685

(22) Filed: Jul. 15, 2019

(65) Prior Publication Data

US 2021/0015046 A1 Jan. 21, 2021

(51) Int. Cl.
- A01D 87/00 (2006.01)
- A01D 89/00 (2006.01)
- A01F 15/10 (2006.01)

(52) U.S. Cl.
CPC ....... *A01D 87/0007* (2013.01); *A01D 89/001* (2013.01); *A01F 15/106* (2013.01)

(58) Field of Classification Search
CPC .............. A01F 15/106; A01F 2015/108; A01F 15/0833; A01D 87/0007; A01D 89/001
See application file for complete search history.

(56) References Cited

U.S. PATENT DOCUMENTS

| | | | | |
|---|---|---|---|---|
| 3,665,690 A | * | 5/1972 | Wenger | A01F 15/07 56/341 |
| 3,901,008 A | * | 8/1975 | Taylor | A01D 87/10 56/344 |
| 4,686,820 A | * | 8/1987 | Andra | A01F 15/0833 100/88 |
| 4,748,801 A | * | 6/1988 | Sheehan | A01F 15/0833 56/341 |
| 5,595,055 A | * | 1/1997 | Horchler, Jr. | A01D 90/02 100/88 |
| 5,819,515 A | * | 10/1998 | Ratzlaff | A01F 15/106 56/341 |
| 5,848,523 A | * | 12/1998 | Engel | A01F 15/106 56/341 |
| 6,029,434 A | * | 2/2000 | Ratzlaff | A01F 15/07 100/88 |

(Continued)

FOREIGN PATENT DOCUMENTS

| EP | 3078255 A1 | 10/2016 |
|---|---|---|
| JP | 2013118834 A | 6/2013 |

OTHER PUBLICATIONS

European Search Report issued in counterpart application No. 20185046.8 dated Dec. 4, 2020 (09 pages).

*Primary Examiner* — Arpad Fabian-Kovacs

(57) ABSTRACT

A baler includes a housing forming a baling chamber. The baling chamber has an inlet that defines an inlet width perpendicular to a central longitudinal axis of the baler. A pre-cutter is disposed forward of the inlet along the central longitudinal axis and includes a cutter width perpendicular to the central longitudinal axis. The cutter width is substantially less than the inlet width. A crop distributor is disposed between the pre-cutter and the inlet and conveys the crop material from the pre-cutter to the inlet. A pick-up head is disposed forward of the pre-cutter and lifts the crop material from the ground and conveys it to the pre-cutter.

15 Claims, 6 Drawing Sheets

(56) References Cited

U.S. PATENT DOCUMENTS

| | | | | |
|---|---|---|---|---|
| 7,818,954 | B2* | 10/2010 | Rempe | A01F 15/106 56/341 |
| 8,205,424 | B1 | 6/2012 | Lang et al. | |
| 8,443,580 | B2* | 5/2013 | Matousek | A01D 43/006 56/341 |
| 8,464,508 | B2* | 6/2013 | Matousek | A01D 43/006 56/341 |
| 8,490,375 | B2* | 7/2013 | Kendrick | A01D 43/06 56/341 |
| 8,833,049 | B2* | 9/2014 | Matousek | A01D 41/1243 56/341 |
| 2018/0027742 | A1 | 2/2018 | Schinstock | |

* cited by examiner

ROUND BALER WITH PRE-CUTTER AND CROP DISTRIBUTION SYSTEM

TECHNICAL FIELD

The disclosure generally relates to a baler, and more particularly to a round baler.

BACKGROUND

Balers are used to gather a cut crop material and form the crop material into a bale that is tightly bound together. Balers include a housing the forms a baling chamber, within which the bale is formed. Some balers, e.g., small square balers and large square balers, form the bale into a rectangular shape, while other balers, e.g., round balers, form the bale into a round or cylindrical shape.

Traditionally, the size of round bales has been limited to a width or height of approximately four or five feet, with a diameter ranging between three and six feet. Accordingly, the largest traditional round bale has a bale diameter of approximately six feet, and a bale width of approximately five feet. Although this bale size has met customer needs, the size of farms and bale handling equipment has grown, and a larger bale size is desired in an effort to reduce the number of bales that need to be handled.

If the bale diameter is increased without increasing the bale width, the resultant bale is tall and narrow, would be unstable, and would tend to fall over on its side once deposited on the ground. Accordingly, in order to increase the bale size, it is necessary to increase both the bale diameter and the bale width proportionally, so that the resultant round bale is stable.

Balers may optionally be equipped with a pre-cutter. The pre-cutter cuts the crop material into shorter segments prior to being introduced into the baling chamber. Traditionally, the pre-cutter includes a cutter width that is substantially equal to a width of the baler. However, increasing the cutter width to accommodate balers configured to produce bales having a width greater than the current standard is costly.

SUMMARY

A baler for forming crop material into a bale is provided. The baler includes a housing forming a baling chamber. The baling chamber has an inlet that defines an inlet width. The inlet width extends perpendicular to a central longitudinal axis of the baler. A pre-cutter is disposed forward of the inlet along the central longitudinal axis. The pre-cutter is operable to cut the crop material into segments. The pre-cutter includes a cutter width that extends perpendicular to the central longitudinal axis. The cutter width is less than the inlet width.

In one embodiment of the disclosure, the cutter width is less than ninety percent of the inlet width. In another embodiment of the disclosure, the cutter width is less than fifty percent of the inlet width.

In one aspect of the disclosure, the baler includes a crop distributor. The crop distributor is disposed between the pre-cutter and the inlet along the central longitudinal axis. The crop distributor includes a forward end and a rearward end. The forward end of the crop distributor is operable to receive the crop material from the pre-cutter. The rearward end of the crop distributor is operable to disperse the crop material through the inlet and into the baling chamber. One of the baling chamber and the crop distributor is moveable relative to the other of the baling chamber and the crop distributor, such that the rearward end of the crop distributor is laterally moveable relative to the central longitudinal axis, between a first lateral side and a second lateral side of the housing. The relative movement between the rearward end of the crop distributor and the inlet distributes the crop material across the inlet width of the baling chamber.

In one embodiment of the disclosure, the crop distributor is moveable relative to the housing. An actuator is coupled to the crop distributor. The actuator is operable to move the crop distributor relative to the baling chamber. The crop distributor is rotatable about a pivot axis, such that the rearward end of the crop distributor moves laterally relative to the central longitudinal axis.

In one aspect of the disclosure, the crop distributor includes a distributor width extending perpendicular to the central longitudinal axis. The distributor width may be less than the inlet width. In one embodiment, the distributor width is substantially equal to the cutter width.

In one aspect of the disclosure, the baler includes a pick-up head. The pick-up head is disposed forward of the pre-cutter along the central longitudinal axis. The pick-up head is operable to lift the crop material from a ground surface and convey the crop material to the pre-cutter. The pick-up head includes a pick-up width extending perpendicular to the central longitudinal axis. In one embodiment, the cutter width is less than the pick-up width.

In one aspect of the disclosure, the pick-up head may include a lateral movement element that is operable to move the crop material laterally relative to the central longitudinal axis and toward the pre-cutter.

Accordingly, even though the cutter width is less than the inlet width of the baler, the crop distributor receives the crop material from the pre-cutter, and distributes the crop material across the inlet width, so that the baling chamber is supplied with an even distribution of crop material across the inlet width and forms a bale of consistent and uniform density. For this reason, the pre-cutter may be sized to have a cutter width that is less than the inlet width. As such, the baler may be equipped with a pre-cutter having a standard cutter width, e.g., four or five feet, while the baling chamber is configured to produce a much wider bale, e.g., up to or more than eight feet. By doing so, the same pre-cutter may be used with balers configured to form standard size bales, e.g., four for five feet in width, or large size bales, e.g., up to or larger than eight feet in width, thereby minimizing the cost associated with including the pre-cutter on the baler.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
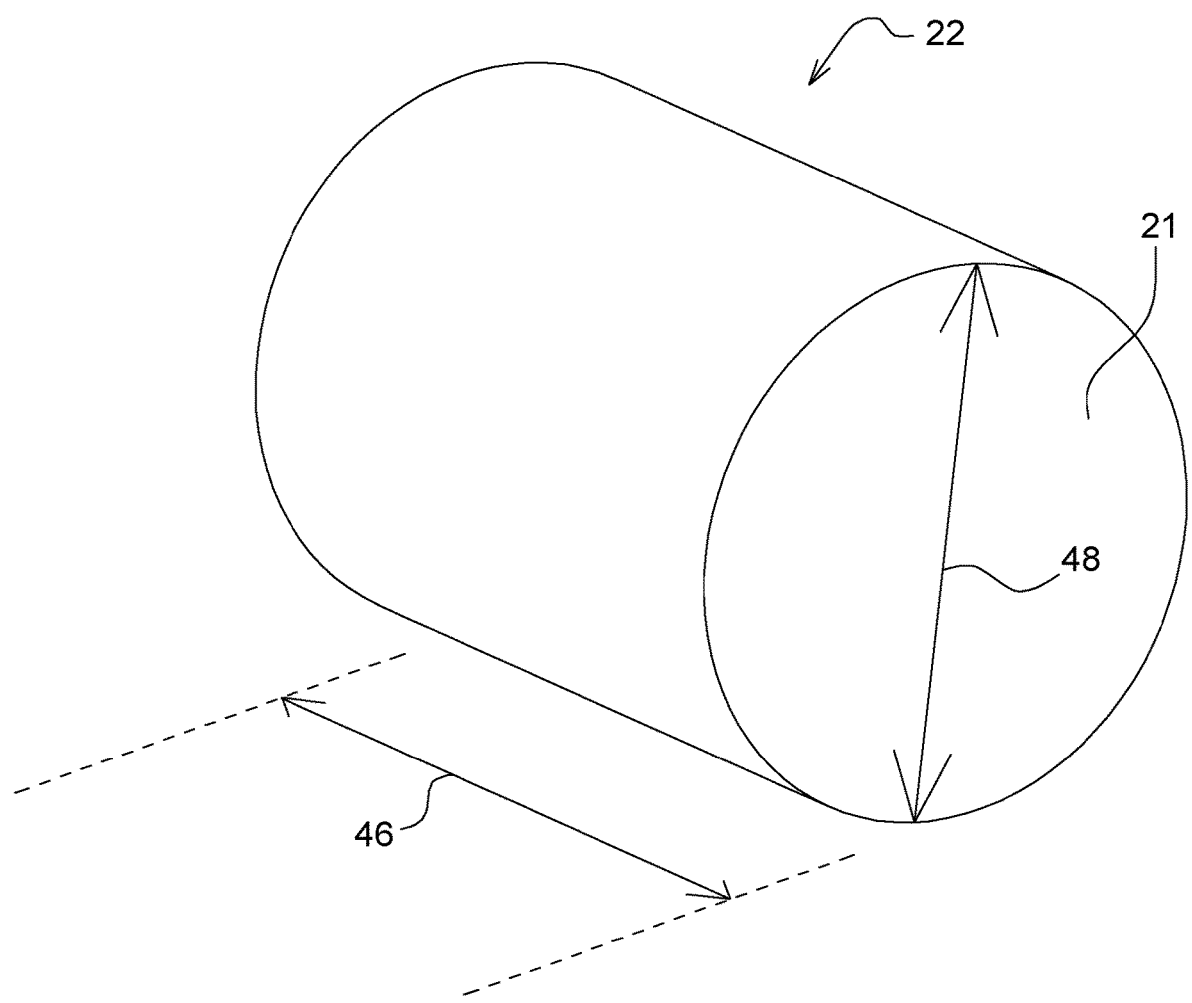
FIG. 1 is a schematic perspective view of a round bale.
Figure 2:
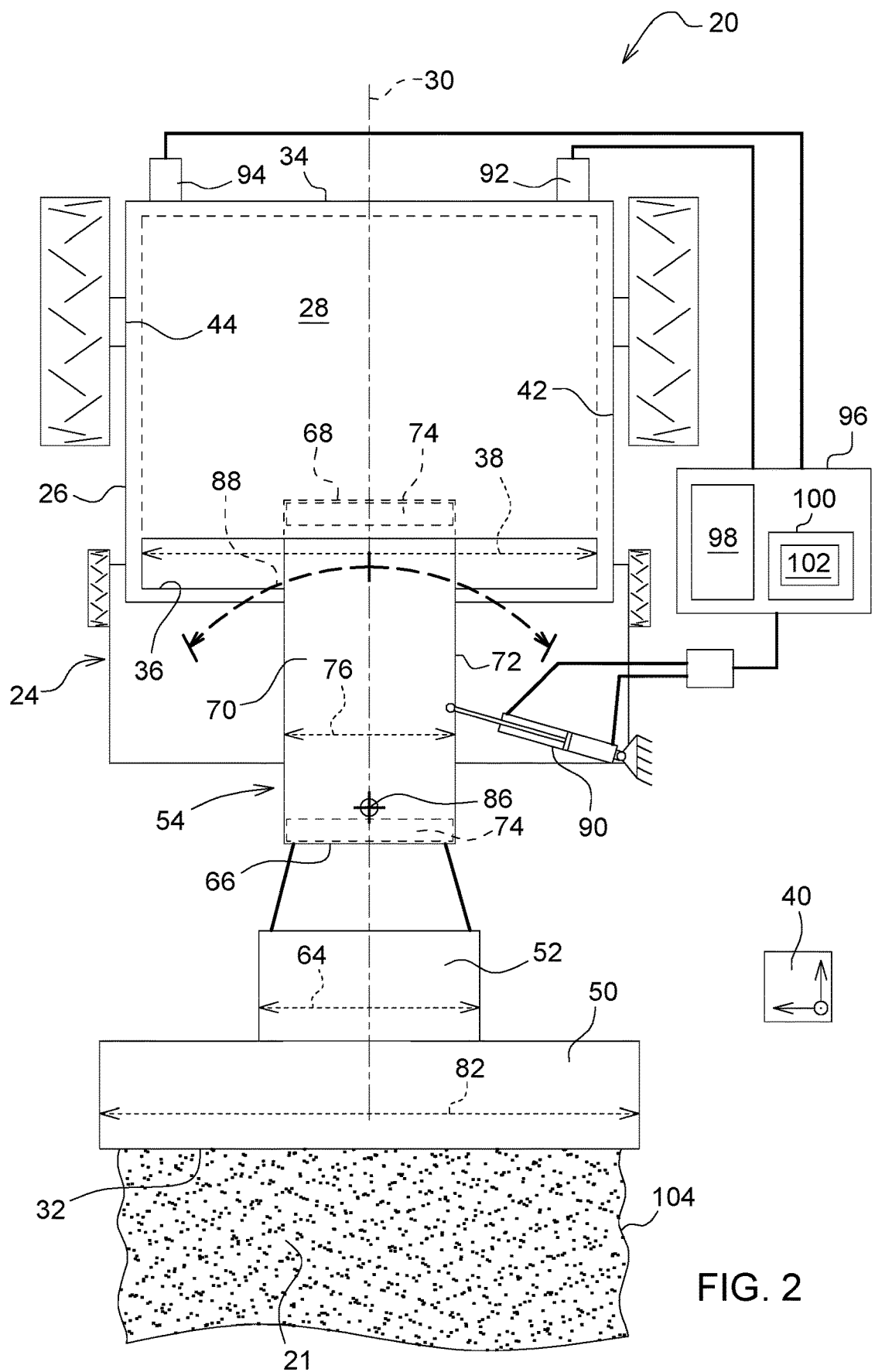
FIG. 2 is a schematic top plan view of a baler showing a crop distributor centrally located within an inlet of a baling chamber.
Figure 3:
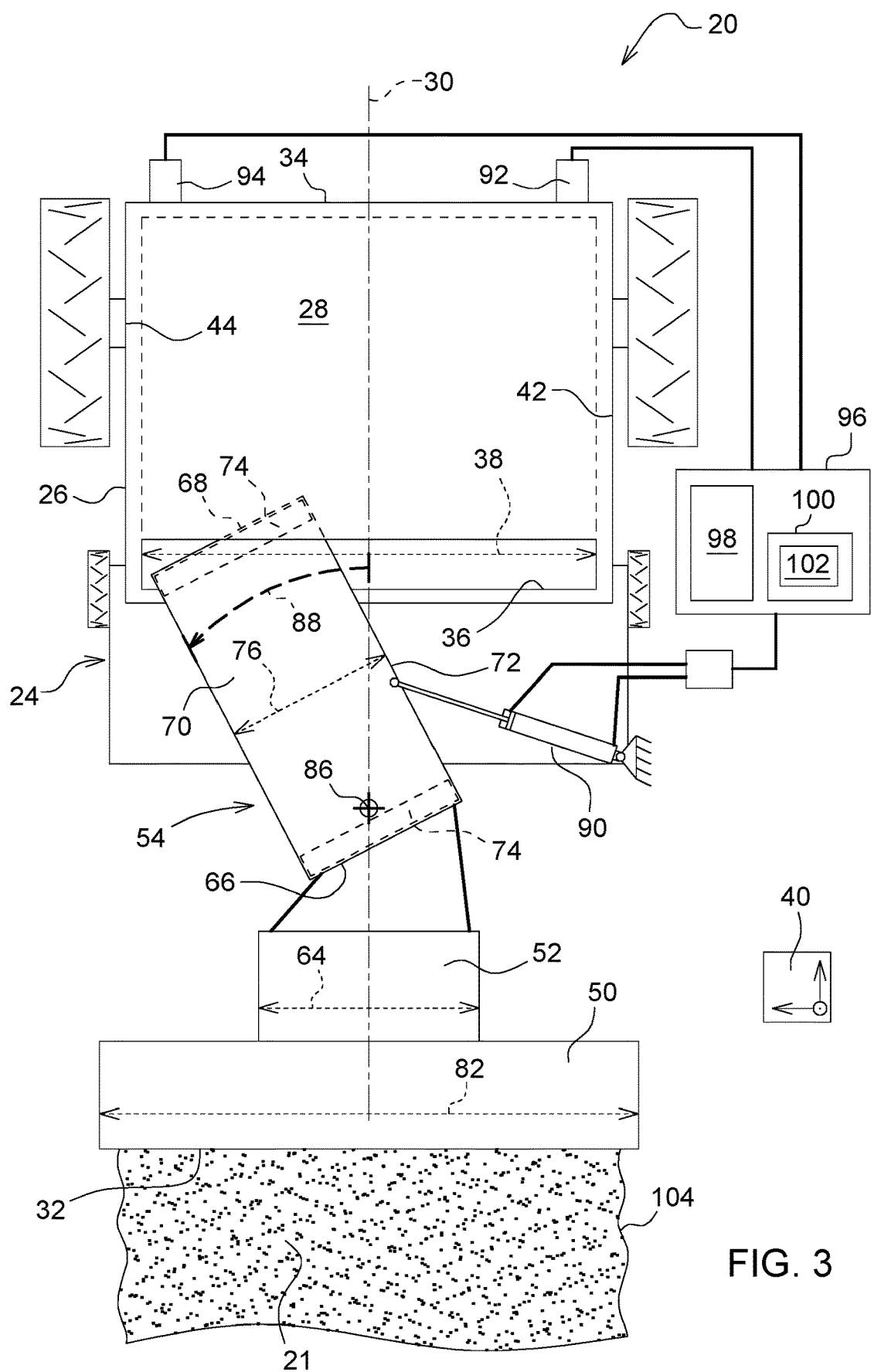
FIG. 3 is a schematic top plan view of the baler showing the crop distributor disposed adjacent a first lateral side of the inlet.
Figure 4:
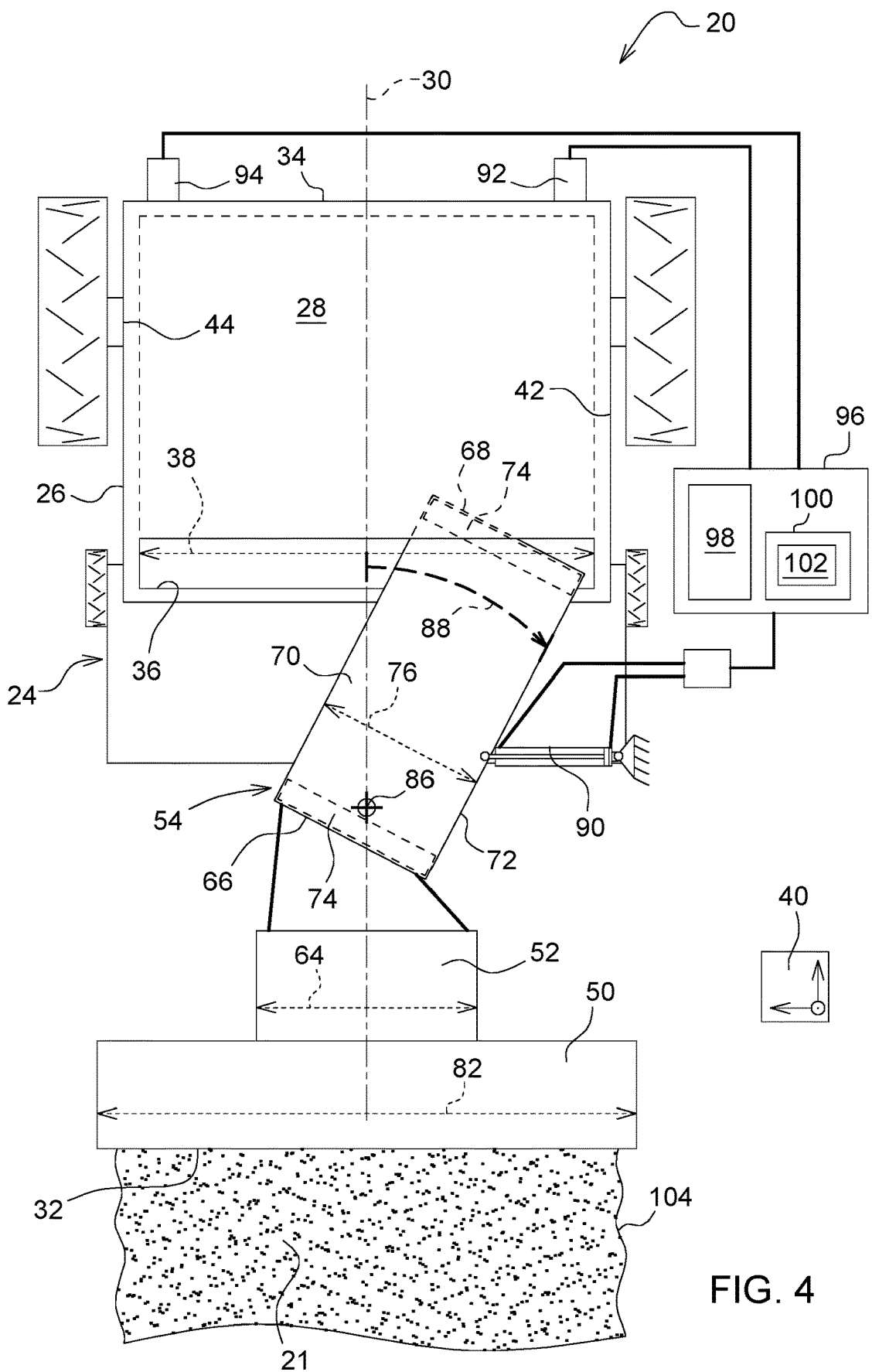
FIG. 4 is a schematic top plan view of the baler showing the crop distributor disposed adjacent a second lateral side of the inlet.

Referring to the Figures, wherein like numerals indicate like parts throughout the several views, a baler is generally shown at 20. The baler 20 forms cut crop material 21 into a bale 22, which is generally shown in FIG. 1. On some embodiments, such as shown in FIGS. 2-4, the baler 20 may be embodied as a drawn baler 20, which is drawn or pulled by a vehicle, e.g., an agricultural tractor (not shown). In other embodiments, the baler 20 may be embodied as a self-propelled baler, having a prime mover, a steering system, etc. Additionally, the Figures and the detailed description describe the baler 20 as a round baler 20 operable to form a round bale 22, such as shown in FIG. 4. However, it should be appreciated that the teachings of this disclosure may be applied to a baler operable to form a rectangular bale, e.g., a large square baler.

Referring to FIGS. 2-4, the baler 20 includes a frame 24, which supports a housing 26. The housing 26 forms a baling chamber 28. The baler 20 extends along a central longitudinal axis 30, which extends between a front 32 of the baler 20 and a rear 34 end of the baler 20. It should be appreciated that the front 32 of the baler 20 faces the direction of travel during baling operations. The central longitudinal axis 30 of the baler 20 extends parallel with a primary direction of travel of the baler 20 and is centrally located and extends along a longitudinal length of the baler 20. The housing 26 is attached to and supported by the frame 24. It should be appreciated that the housing 26 may include various panels, supports, brackets, etc., which form and support the bailing chamber, secure the housing 26 to the frame 24, and which may support other components of the baler 20.

The baling chamber 28 includes an inlet 36, through which the crop material is supplied or input into the baling chamber 28. The baling chamber 28 is configured to form the crop material into the bale 22. The baler 20 may include any system and/or configuration of components that are capable of forming the crop material into the bale 22. For example, the baler 20 may include, but is not limited to, a variable size bale formation system or a fixed size bale formation system, such as known to those skilled in the art. The specific features, components, and processes used to form the bale 22 within the baling chamber 28 are known to those skilled in the art, are not pertinent to the teachings of this disclosure, and are therefore not described in detail herein.

The inlet 36 defines an inlet width 38 that extends perpendicular to the central longitudinal axis 30. The inlet width 38 is measured on a substantially horizontal plane 40, transverse and generally perpendicular to the central longitudinal axis 30 of the baler 20. The inlet width 38 extends substantially across the baling chamber 28 and includes a first lateral side 42 and a second lateral side 44. The first lateral side 42 and the second lateral side 44 are disposed on opposing ends or sides of the inlet 36 and cooperate to define the inlet width 38 therebetween. The first lateral side 42 may be considered a left lateral side, whereas the second lateral side 44 may be considered a right lateral side. The inlet width 38 approximately corresponds to a desired width of the bale 22 to be formed within the baling chamber 28. For example, referring to FIG. 1, if the baling chamber 28 is sized to form a bale 22 having a bale width 46 approximately equal to eight feet (8'), then the inlet width 38 is also approximately equal to eight feet. It should be appreciated that the bailing chamber is configured to form the bale 22 to include a bale diameter 48 that is proportionally sized to the bale width 46 so that the bale 22 is stable when placed on the ground, and not likely to tip over.

The baler 20 further includes a pick-up head 50, which supplies the crop material to a pre-cutter 52. The pre-cutter 52 further processes the crop material and supplies the crop material to a crop distributor 54. The crop distributor 54 conveys the crop material through the inlet 36 of the baling chamber 28, wherein the crop material is formed into the bale 22.

Figure 5:
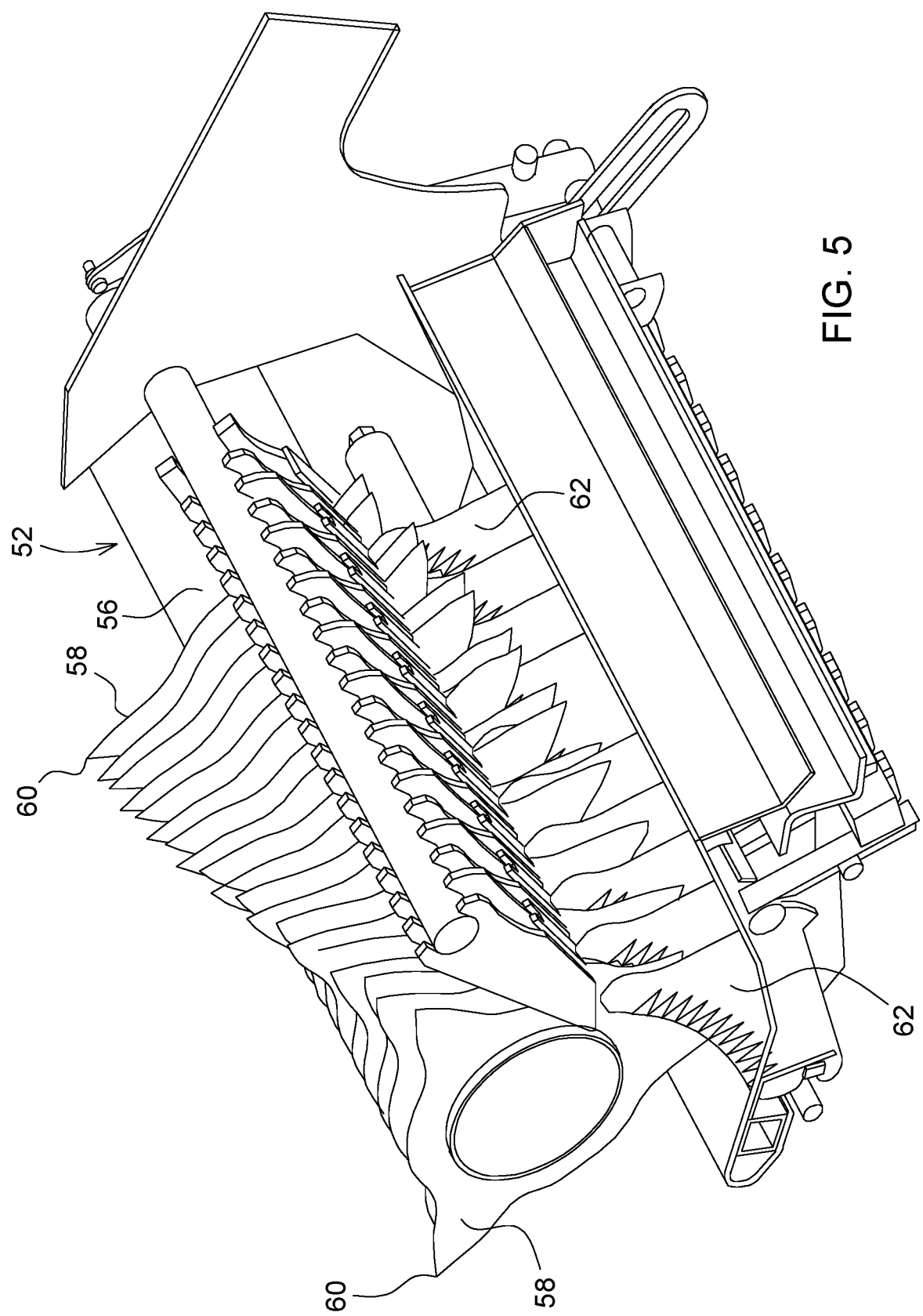
FIG. 5 is a schematic perspective view of a pre-cutter of the baler.

The pre-cutter 52 is disposed forward of the inlet 36 along the central longitudinal axis 30. The pre-cutter 52 may include a cutter system that is capable of processing the crop material into shorter segments, as is understood by those skilled in the art. Referring to FIG. 5, one example embodiment of the pre-cutter 52 is generally shown. The example embodiment of the pre-cutter 52 includes a cylindrical rotor 56, having a plurality of tines 58 extending radially outward from the rotor 56. The tines 58 are mounted in spaced, parallel relation relative to each other along the length of the rotor 56. Each of the tines 58 include multiple crop engaging points 60. The crop engaging points 60 are arranged equalangularly about a rotation axis of the rotor 56. The pre-cutter 52 further includes a plurality of knives 62. Generally, the knives 62 remain stationary relative to the rotor 56 and the tines 58, although the knives 62 may be configured to trip or move away from the rotor 56 in response to sufficient force, such as when a rock contacts the knives 62. The tines 58 are positioned to sweep parallel paths on opposite sides of the knives 62. During operation, the tines 58 move the crop material across the knives 62, such that the knives 62 cut the crop material into shorter segments. The example pre-cutter 52 described above is merely one example of a suitable pre-cutter 52. It should be appreciated that the pre-cutter 52 may be configured differently than the example shown in FIG. 5 and described herein. Other examples of the pre-cutter 52 may include, but are not limited to, a cylindrical cutter-head or a shear-bar type cutter-head, such as often used on forage harvesters.

The pre-cutter 52 includes a cutter width 64. The cutter width 64 is the width or span across which the pre-cutter 52 is operable to cut the crop material. The cutter width 64 is measured perpendicular to the central longitudinal axis 30, on the horizontal plane 40. The cutter width 64 may be less than the inlet width 38. In one embodiment, the cutter width 64 is less than ninety percent of the inlet width 38. In another example embodiment, the cutter width 64 is less than fifty percent of the inlet width 38.

Referring to FIGS. 2-4, the baler 20 further includes the crop distributor 54. The crop distributor 54 is disposed between the pre-cutter 52 and the inlet 36 along the central longitudinal axis 30. The crop distributor 54 includes a forward end 66 and a rearward end 68. The forward end 66 of the crop distributor 54 is disposed nearer the front 32 of the baler 20 than the rearward end 68 of the crop distributor 54, relative to the direction of travel of the baler 20. The forward end 66 of the crop distributor 54 is operable to receive the cut crop material from the pre-cutter 52. The rearward end 68 of the crop distributor 54 is operable to dispense or feed the cut crop material into the inlet 36 of the baling chamber 28. As such, the rearward end 68 of the crop distributor 54 is disposed adjacent the inlet 36 of the baling chamber 28.

The crop distributor 54 includes a conveyor 70. The conveyor 70 is operable to move the crop material from the forward end 66 of the crop distributor 54 to the rearward end 68 of the crop distributor 54. The conveyor 70 may include any device or system capable of moving the crop material from the forward end 66 to the rearward end 68 of the crop distributor 54. In one example embodiment, the conveyor 70 includes an endless loop 72 mounted on and around two or more drums 74. The endless loop 72 moves in an endless cycle around the two or more drums 74, between the forward end 66 and the rearward end 68. The endless loop 72 may include, but is not limited to, a belt, chain, or other similar device. It should be appreciated that the conveyor 70 may be embodied differently than the endless loop 72 described herein and shown in the Figures. For example, in another embodiment, the conveyor 70 may include one or more augers or other similar devices capable of moving the crop material.

The crop distributor 54 includes a distributor width 76. The distributor width 76 is measured on the substantially horizontal plane 40, transverse and generally perpendicular to the central longitudinal axis 30 of the baler 20. The distributor width 76 is the width of the portion of the crop distributor 54 that is used to move the crop material. For example, in the embodiment shown in the Figures and described herein, the distributor width 76 is approximately equal to the width of the endless loop 72. However, it should be appreciated that other embodiments of the crop distributor 54 may define the distributor width 76 differently than the example embodiment described herein.

The distributor width 76 is substantially less than the inlet width 38. In one embodiment, the distributor width 76 is less than approximately seventy five percent of the inlet width 38. In another embodiment, the distributor width 76 is less than approximately fifty percent of the inlet width 38. In yet another embodiment, the distributor width 76 is less than approximately twenty five percent of the inlet width 38. In the example shown in the Figures, the distributor width 76 is substantially equal to the cutter width 64. However, in other embodiments, the distributor width 76 may be greater than or less than the cutter width 64.

The baler 20 may further include the pick-up head 50. As shown in the example embodiment, the pick-up head 50 is disposed adjacent to and forward of the pre-cutter 52 along the central longitudinal axis 30. The pick-up head 50 is operable to lift the cut crop material from a ground surface and convey the cut crop material to the pre-cutter 52. The pre-cutter 52 further processes the crop material and deposits the crop material on the forward end 66 of the crop distributor 54. The conveyor 70 of the crop distributor 54 moves the crop material to the rearward end 68 of the crop distributor 54, from which it is fed through the inlet 36 and into the baling chamber 28.

Figure 6:
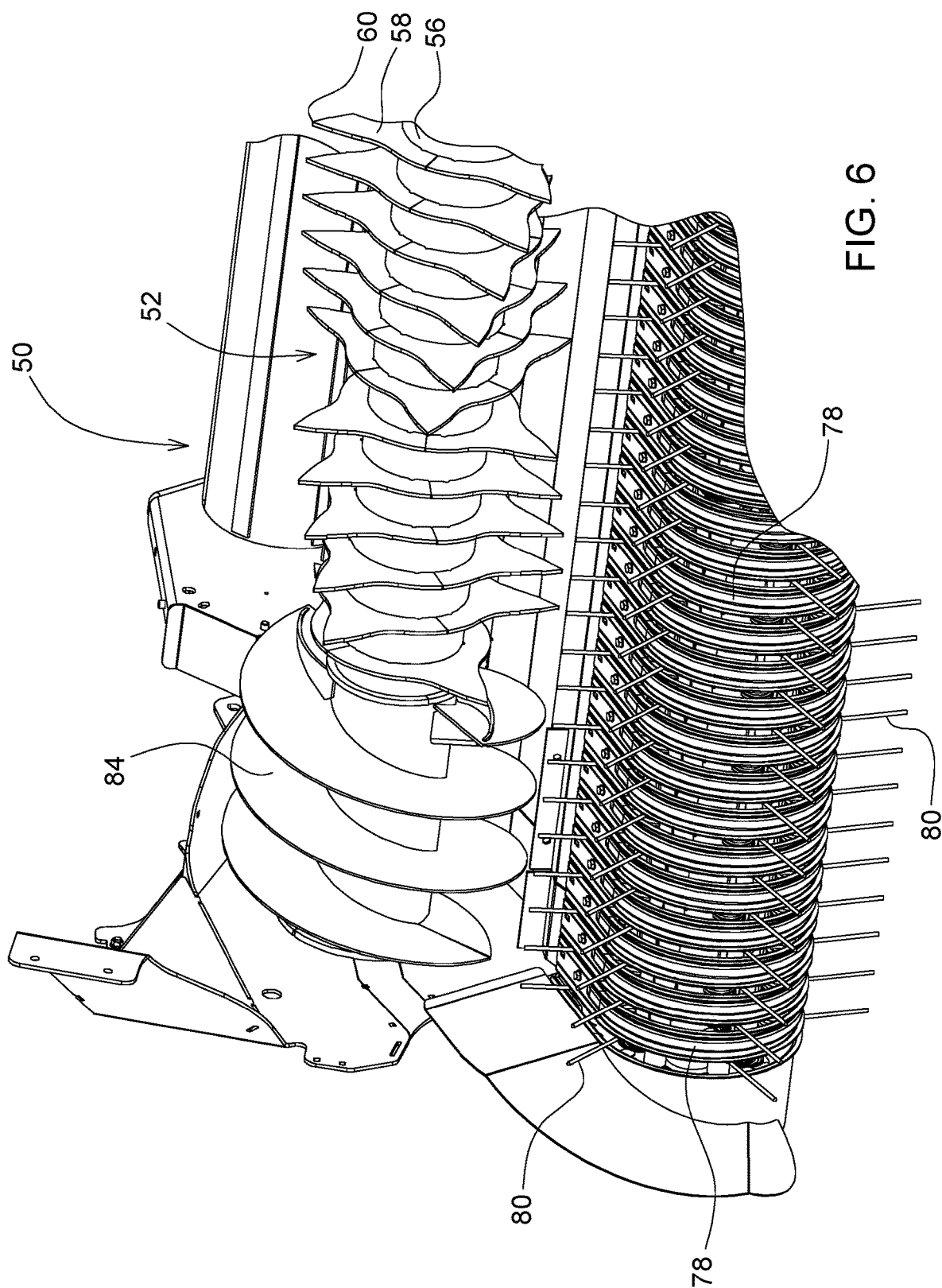
FIG. 6 is a schematic perspective view of a pick-up head of the baler.

The pick-up head 50 may be configured in any suitable manner capable of lifting the crop material from the ground and conveying the crop material to the pre-cutter 52. An example pick-up head 50 is generally shown in FIG. 6. Referring to FIG. 6, the example pick-up head 50 includes a rotating element 78 that extends perpendicular to the central longitudinal axis 30 on the horizontal plane 40. A plurality of fingers 80 extend outward from the rotating element 78. The fingers 80 engage the crop material on the ground, lift the crop material, and convey the crop material rear 34 ward into the pre-cutter 52.

The pick-up head 50 includes or defines a pick-up width 82. The pick-up width 82 is the width of crop material that the pick-up head 50 is capable of lifting off of the ground surface. The pick-up width 82 is measured on the horizontal plane 40 transverse and generally perpendicular to the central longitudinal axis 30 of the baler 20. The pick-up width 82 may be greater than the cutter width 64. In such embodiments, the pick-up head 50 may include a lateral movement element 84 that is operable to move the crop material laterally relative to the central longitudinal axis 30 and toward the pre-cutter 52. For example, referring to FIG. 6, the pick-up head 50 shows a rotating auger disposed laterally outboard of the rotor 56 of the pre-cutter 52. The rotating auger, i.e., the lateral movement element 84 of the pick-up head 50, moves the crop material laterally inboard toward the pre-cutter 52. It should be appreciated that the pick-up head 50 may be configured differently than the example embodiment shown in FIG. 6 and described herein, and may include different features and/or operate in a different manner than the example shown in FIG. 6 and described herein.

In one embodiment, the pick-up width 82 may be greater than the inlet width 38. In another embodiment, the pick-up width 82 may be approximately equal to the inlet width 38. In yet another embodiment, the pick-up width 82 may be less than the inlet width 38. Additionally, the cutter width 64 may be less than the pick-up width 82. Accordingly, the baler 20 may include, for example, a pick-up head 50 having a pick-up width 82 approximately equal to eight feet, and a pre-cutter 52 having a cutter width 64 approximately equal to six feet, or even less. The distributor width 76 may be equal to the cutter width 64, or less than the cutter width 64. As such, the pick-up width 82 may be equal to or greater than the distributor width 76, i.e., the distributor width 76 is less than the pick-up width 82. For example, in one embodiment, the distributor width 76 may be less than seventy five percent of the pick-up width 82. In another example, the distributor width 76 may be less than fifty percent of the pick-up width 82. In yet another example, the distributor width 76 is equal to or less than the cutter width 64, and the cutter width 64 is less than or equal to the pick-up width 82.

One of the baling chamber 28 and the crop distributor 54 is moveable relative to the other of the baling chamber 28 and the crop distributor 54, such that the rearward end 68 of the crop distributor 54 is laterally moveable, relative to the inlet 36 of the baling chamber 28, between the first lateral side 42 and the second lateral side 44. The lateral movement of the rearward end 68 of the crop distributor 54 distributes the cut crop material evenly across the inlet width 38 of the baling chamber 28. This enables the baling chamber 28 and the inlet width 38 to be wider than the pick-up width 82, while still evenly distributing the crop material across the inlet width 38 of the baling chamber 28. Accordingly, the width of the baling chamber 28 may be increased to form a wider bale 22, without having to increase the size of the pre-cutter 52 and the cutter width 64 in proportion. For this reason, the same pre-cutter 52 may be used for a baler 20 that forms a four foot wide bale 22 or a baler 20 that forms an eight foot wide bale 22.

In the example embodiment shown in the Figures and described herein, the crop distributor 54 is moveable relative to the baling chamber 28. However, in other embodiments, it should be appreciated that the relative movement may be reversed, such that the baling chamber 28 moves relative to the crop distributor 54.

In the example embodiment shown in the Figures and described herein, the crop distributor 54 is rotatable about a pivot axis 86. The pivot axis 86 is disposed adjacent the forward end 66 of the crop distributor 54 and is arranged in a substantially vertical orientation, relative to the substantially horizontal plane 40. Because the crop distributor 54 is rotatable about the pivot axis 86 adjacent the forward end 66 of the crop distributor 54, the rearward end 68 of the crop distributor 54 moves laterally along an arcuate path 88 between the first lateral side 42 and the second lateral side 44 of the inlet 36. The crop distributor 54 may be pivotably mounted to the baler 20 in any suitable manner.

In the example embodiment shown in the Figures and described herein, the baler 20 includes an actuator that is coupled to the crop distributor 54. The actuator is operable to move the crop distributor 54 relative to the baling chamber 28. The actuator may include, for example, a double acting cylinder that interconnects the crop distributor 54 to a fixed location, such as the frame 24 or some other rigid component of the baler 20. The double acting cylinder may include, but is not limited to, a hydraulically driven cylinder, a pneumatically driven cylinder, or an electrically driven cylinder. The double acting cylinder is controlled to extend and retract to move the rearward end 68 of the crop distributor 54 laterally, back and forth across the inlet 36 of the baling chamber 28.

The baler 20 may include a left-side sensor 92 and a right-side sensor 94. The left-side sensor 92 is operable to sense a size of the bale 22 being formed within the baling chamber 28 adjacent to the first lateral side 42 of the inlet 36. The right-side sensor 94 is operable to sense a size the bale 22 being formed within the baling chamber 28 adjacent to the second lateral side 44 of the inlet 36. The left-side sensor 92 and the right-side sensor 94 may sense the size of the bale 22 in any suitable manner. For example, the left-side sensor 92 and the right-side sensor 94 may sense and/or determine a diametric or radial size of the bale 22 being formed in the bailing chamber, a weight of the bale 22 being formed in the bailing chamber, or some other characteristic of the bale 22 that enables size determination between the left-lateral side and the second lateral side 44 of the inlet 36.

A computing device 96 is disposed in communication with the left-side sensor 92 and the right-side sensor 94. The computing device 96 is also disposed in communication with the actuator for controlling movement of the actuator. The computing device 96 may alternatively be referred to as a computer, a controller, a module, a control module, a control unit, etc. The computing device 96 is operable to control the operation of the crop distributor 54. The computing device 96 includes a processor 98, a memory 100, and all software, hardware, algorithms, connections, sensors, etc., necessary to manage and control the operation of the crop distributor 54. As such, a method may be embodied as a program or algorithm operable on the computing device 96. It should be appreciated that the computing device 96 may include any device capable of analyzing data from various sensors, comparing data, making the necessary decisions required to control the operation of the crop distributor 54, and executing the required tasks necessary to control the operation of the crop distributor 54.

The computing device 96 may be embodied as one or multiple digital computers or host machines each having one or more processors 98, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 100 may include any non-transitory/tangible medium which participates in providing data or computer-readable instructions. The memory 100 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The computing device 96 includes the tangible, non-transitory memory 100 on which are recorded computer-executable instructions, including a distribution algorithm 102. The processor 98 of the computing device 96 is configured for executing the distribution algorithm 102. The distribution algorithm 102 implements a method of operating the baler 20.

The computing device 96 receives the sensed data from the left-side sensor 92 related to the size of the bale 22 adjacent to the first lateral side 42, and the sensed data from the right-side sensor 94 related to the size of the bale 22 adjacent to the second lateral side 44. The computing device 96 uses this data to determine the relative size of the bale 22 being formed within the bailing chamber, and thereby, which portion of the inlet 36 between the left-lateral side and the second lateral side 44 of the inlet 36 is the smallest and requires additional crop material to even out the bale 22 size.

The computing device 96 is operable to control the actuator to move between the first lateral side 42 and the second lateral side 44 in response to the data received from the left-side sensor 92 and the right-side sensor 94 related to the size of the bale 22 adjacent to the first lateral side 42 and the second lateral side 44 respectively. The computing device 96 controls the movement of the actuator to maintain an approximately even bale 22 size across the inlet width 38, between the first lateral side 42 and the right later side of the baling chamber 28.

For example, referring to FIG. 3, if the computing device 96 determines that the data from the left-side sensor 92 and the right-side sensor 94 indicate that the left-lateral side of the bale 22 being formed in the bailing chamber is smaller than the right-lateral side of the bale 22, then the computing device 96 may control the actuator to move the crop distributor 54 to the left-lateral side of the inlet 36 to provide additional crop material to the left-lateral side of the inlet 36, until the size of the bale 22 at the left-lateral side of the inlet 36 is approximately even with the size of the bale 22 at the right-lateral side of the inlet 36. After which, referring to FIG. 2, the computing device 96 may control the actuator to move the crop distributor 54 in a consistent and even cycle between the left-lateral side and the right-lateral side of the inlet 36 so that crop material is evenly distributed across the entire inlet width 38 of the bailing chamber. Similarly, referring to FIG. 4, if the computing device 96 determines that the data from the left-side sensor 92 and the right-side sensor 94 indicate that the right-lateral side of the bale 22 being formed in the bailing chamber is smaller than the left-lateral side of the bale 22, then the computing device 96 may control the actuator to move the crop distributor 54 to the right-lateral side of the inlet 36 to provide additional crop material to the right-lateral side of the inlet 36, until the size of the bale 22 at the right-lateral side of the inlet 36 is approximately even with the size of the bale 22 at the left-lateral side of the inlet 36. After which, referring to FIG. 2, the computing device 96 may control the actuator to move the crop distributor 54 in a consistent and even cycle between the left-lateral side and the right-lateral side of the inlet 36 so that crop material is evenly distributed across the entire inlet width 38 of the bailing chamber.

The relative lateral movement between the crop distributor 54 and the bailing chamber enables the crop material to be evenly distributed across the entire inlet width 38 of the bailing chamber, without having to weave the bailer left and right across a windrow 104 to feed the bailing chamber. Additionally, because the crop distributor 54 may evenly feed the crop material into the inlet 36, the inlet width 38 is not limited by the pick-up width 82 of the pick-up head 50 and/or the cutter width 64 of the pre-cutter 52. As such, the bailing chamber and the inlet width 38 may be sized up to provide a round bale 22 having a bale width 46 that is greater than the pick-up width 82 of the pick-up head 50 and/or the cutter width 64 of the pre-cutter 52. These features combine to provide a round baler 20 that may be configured to use standard sized pre-cutter 52, e.g., having a cutter width 64 approximately equal to five or six feet, with a bailing chamber sized to form a bale 22 having a bale width 46 of up to and over eight feet wide.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler for forming crop material into a bale, the baler comprising:
    a housing forming a baling chamber having an inlet, wherein the inlet defines an inlet width perpendicular to a central longitudinal axis;
    a pre-cutter disposed forward of the inlet along the central longitudinal axis, wherein the pre-cutter is operable to cut the crop material into segments;
    wherein the pre-cutter includes a cutter width perpendicular to the central longitudinal axis; and
    wherein the cutter width is less than the inlet width;
    a crop distributor disposed between the pre-cutter and the inlet along the central longitudinal axis, wherein the crop distributor includes a forward end operable to receive the crop material from the pre-cutter and a rearward end operable to disperse the crop material through the inlet and into the baling chamber;
    wherein the crop distributor is rotatable about a pivot axis, such that the rearward end of the crop distributor moves laterally relative to the central longitudinal axis between a first lateral side and a second lateral side of the housing to distribute the crop material across the inlet width of the baling chamber;
    an actuator coupled to the crop distributor and operable to move the crop distributor relative to the baling chamber;
    a first sensor configured to sense data related to a size of the bale adjacent the first lateral side;
    a second sensor configured to sense data related to a size of the bale adjacent the second lateral side;
    a controller disposed in communication with the actuator, the first sensor, and the second sensor, the controller including a processor and a memory having a distribution algorithm stored thereon, wherein the processor is operable to execute the distribution algorithm to:
        receive the data from the first sensor related to the size of the bale adjacent the first lateral side and the data from the second sensor related to the size of the bale adjacent the second lateral side;
        control the actuator to move the crop distributor between the first lateral side and the second lateral side in response to the data from the first sensor related to the size of the bale adjacent the first lateral side and the data from the second sensor related to the size of the bale adjacent the second lateral side to maintain a constant size of the bale across the entire width of the inlet width.

2. The baler set forth in claim 1, wherein the cutter width is less than ninety percent of the inlet width.

3. The baler set forth in claim 1, wherein the cutter width is less than fifty percent of the inlet width.

4. The baler set forth in claim 1, wherein the crop distributor is moveable relative to the housing.

5. The baler set forth in claim 1, wherein the crop distributor includes a distributor width perpendicular to the central longitudinal axis.

6. The baler set forth in claim 5, wherein the distributor width is less than the inlet width.

7. The baler set forth in claim 5, wherein the distributor width is substantially equal to the cutter width.

8. The baler set forth in claim 1, further comprising a pick-up head disposed forward of the pre-cutter along the central longitudinal axis, wherein the pick-up head is operable to lift the crop material from a ground surface and convey the crop material to the pre-cutter.

9. The baler set forth in claim 8, wherein the pick-up head includes a pick-up width perpendicular to the central longitudinal axis, and wherein the cutter width is less than the pick-up width.

10. The baler set forth in claim 8, wherein the pick-up head includes a lateral movement element operable to move the crop material laterally relative to the central longitudinal axis and toward the pre-cutter.

11. The baler set forth in claim 1, wherein the processor is operable to execute the distribution algorithm to determine if the size of the bale adjacent the left lateral side is smaller than the size of the bale adjacent the right lateral side, if the size of the bale adjacent the right lateral side is smaller than the size of the bale adjacent the left lateral side, or if the size of the bale adjacent the left lateral side is substantially equal to the size of the bale adjacent the right lateral side.

12. The baler set forth in claim 11, wherein the processor is operable to execute the distribution algorithm to control the actuator to move the crop distributor to the left lateral side of the inlet to provide additional crop material thereto when the size of the bale adjacent the left lateral side is smaller than the size of the bale adjacent the right lateral side.

13. The baler set forth in claim 11, wherein the processor is operable to execute the distribution algorithm to control the actuator to move the crop distributor to the right lateral side of the inlet to provide additional crop material thereto when the size of the bale adjacent the right lateral side is smaller than the size of the bale adjacent the left lateral side.

14. The baler set forth in claim 11, wherein the processor is operable to execute the distribution algorithm to control the actuator to move the crop distributor in a consistent and even cycle between the left lateral side and the right lateral side of the inlet to distribute crop material across the inlet width when the size of the bale adjacent the left lateral side is substantially equal to the size of the bale adjacent the right lateral side.

15. The baler set forth in claim 1, wherein each of the first sensor and the second sensor include one of a size sensor or a weight sensor.

\* \* \* \* \*